(12) United States Patent
Jeon et al.

(10) Patent No.: US 11,285,836 B2
(45) Date of Patent: Mar. 29, 2022

(54) METHOD AND APPARATUS FOR CONTROLLING SCHEDULED CHARGING

(71) Applicants: Hyundai Motor Company, Seoul (KR); Kia Motors Corporation, Seoul (KR)

(72) Inventors: Sung Bae Jeon, Gyeonggi-do (KR); Jin Kyeom Cho, Gyeonggi-do (KR); Hui Un Son, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 274 days.

(21) Appl. No.: 16/730,285

(22) Filed: Dec. 30, 2019

(65) Prior Publication Data
US 2021/0053457 A1 Feb. 25, 2021

(30) Foreign Application Priority Data
Aug. 22, 2019 (KR) .................. 10-2019-0103051

(51) Int. Cl.
*H02J 7/00* (2006.01)
*H02J 7/14* (2006.01)
*B60L 53/62* (2019.01)
*B60L 58/12* (2019.01)
*B60K 6/28* (2007.10)

(52) U.S. Cl.
CPC .............. *B60L 53/62* (2019.02); *B60L 58/12* (2019.02); *H02J 7/0048* (2020.01); *H02J 7/0071* (2020.01); *H02J 7/007192* (2020.01); *B60K 6/28* (2013.01); *B60L 2240/80* (2013.01); *B60Y 2200/91* (2013.01); *B60Y 2200/92* (2013.01); *B60Y 2300/91* (2013.01)

(58) Field of Classification Search
USPC ....................................................... 320/109
See application file for complete search history.

(56) References Cited

U.S. PATENT DOCUMENTS

| | | | |
|---|---|---|---|
| 9,423,465 B1 * | 8/2016 | Watts .................. | B60L 5/42 |
| 9,955,428 B1 * | 4/2018 | Bacarella .............. | H02J 7/005 |
| 2016/0089994 A1 * | 3/2016 | Keller .................. | H02J 7/04 |
| | | | 320/153 |
| 2016/0332527 A1 * | 11/2016 | North .................. | H02J 3/322 |

(Continued)

FOREIGN PATENT DOCUMENTS

| KR | 10-1575469 B1 | 12/2015 |
|---|---|---|
| KR | 10-1619549 B1 | 5/2016 |

*Primary Examiner* — Alexis B Pacheco
(74) *Attorney, Agent, or Firm* — Mintz Levin Cohn Ferris Glovsky and Popeo, P.C.; Peter F. Corless

(57) ABSTRACT

A method of controlling scheduled charging is provided. The method includes calculating a primary scheduled charge time based on an expected charge time consumption and an expected primary scheduled charge start time and calculating an expected temperature for the primary scheduled charge time based on the primary scheduled charge time and charger temperature information or climate information. A corrected expected charge time consumption is calculated based on the calculated expected temperature and a secondary scheduled charge time is calculated based on the corrected expected charge time consumption. A vehicle battery is charged based on the secondary scheduled charge time.

19 Claims, 4 Drawing Sheets

(56) References Cited

U.S. PATENT DOCUMENTS

| | | | | |
|---|---|---|---|---|
| 2017/0310140 A1* | 10/2017 | Asghari | .................... | H02J 3/32 |
| 2017/0326999 A1* | 11/2017 | Tani | ...................... | H02J 7/0013 |
| 2018/0111493 A1* | 4/2018 | Chan | ..................... | H02J 7/0029 |
| 2018/0253788 A1* | 9/2018 | Takatsuka | .............. | G06Q 30/06 |
| 2019/0070970 A1* | 3/2019 | Chan | ...................... | G05B 15/02 |
| 2020/0164764 A1* | 5/2020 | Son | ......................... | B60K 6/26 |

\* cited by examiner

Charging Efficiency As A Function Of Temperature

METHOD AND APPARATUS FOR CONTROLLING SCHEDULED CHARGING

CROSS-REFERENCE TO RELATED APPLICATION(S)

This application claims the benefit of Korean Patent Application No. 10-2019-0103051, filed on Aug. 22, 2019, which is hereby incorporated by reference as if fully set forth herein.

BACKGROUND

Field of the Invention

The present disclosure relates to a method and apparatus for controlling scheduled charging, and more particularly, to a method and apparatus for controlling scheduled charging to increase a full-charge success rate.

Discussion of the Related Art

Recently, electric vehicles have been continuously developed in response to environmental pollution and efforts to develop technology using alternative energy sources. An electric vehicle uses an electric motor as a driving source, and a battery, which is an energy source for driving the electric motor, is connected to the electric motor, via an inverter to supply power to the electric motor. The electric vehicle charges and discharges the battery through scheduled charging and may use various data to ensure scheduled charging.

FIG. 1 is a diagram showing an example of charge time determination using a conventional scheduled charging method according to the related art. FIG. 2 is a diagram showing an example of battery temperature efficiency related to FIG. 1 according to the related art. Referring to FIGS. 1 and 2, in the existing scheduled charge time determination using a conventional scheduled charging method, an expected charge time Dchg is determined based on current charged power, and a charge time is determined to fall within an inexpensive charge range $D_{econchg}$ while satisfying the expected charge time $D_{chg}$. In particular, to increase a full-charge success rate, previous charging $D_{prechg}$ is preferred.

However, the expected charge time $D_{chg}$, determined based on charged power at a time point of waiting for scheduled charging, is used, and thus there is a problem in that full charging fails when actually charged power is less than expected. In addition, a battery has a property whereby efficiency changes greatly due to temperature, and thus there is a problem in that full charge fails when a substantial change in battery temperature occurs from when actual charging begins. Accordingly, there is a need to develop a device for increasing a full-charge success rate through scheduled charging by determining a scheduled charge time that takes into consideration an increase in battery temperature.

SUMMARY

An object of the present disclosure is to provide a method and apparatus for controlling scheduled charging for increasing a full-charge success rate through scheduled charging using a procedure of correcting a charge time based on climate information in consideration of efficiency based on a battery temperature when a scheduled charge time is determined.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

In accordance with the purpose of the disclosure, as embodied and broadly described herein, a method of controlling scheduled charging may include calculating a primary scheduled charge time based on an expected charge time consumption and an expected primary scheduled charge start time, calculating an expected temperature for the primary scheduled charge time based on the primary scheduled charge time and charger temperature information or climate information, calculating a corrected expected charge time consumption based on the calculated expected temperature, and calculating a secondary scheduled charge time based on the corrected expected charge time consumption.

In some exemplary embodiments, the calculating of the expected temperature for the primary scheduled charge time may include determining whether the charger temperature information exists. Additionally, the calculating of the expected temperature for the primary scheduled charge time may include calculating an expected temperature for the expected primary scheduled charge start time based on the charger temperature information when the charger temperature information exists.

The calculating of the expected temperature for the primary scheduled charge time may include calculating an expected temperature for the expected primary scheduled charge start time based on the climate information when the charger temperature information does not exist. The charger temperature information may include time-based temperature information of an all-day charger.

The method may further include comparing an expected temperature for the expected secondary scheduled charge start time with an expected temperature for the expected primary scheduled charge start time. In some exemplary embodiments, the method may further include determining the secondary scheduled charge time to be a final charge time when a temperature difference resulting from the comparing is equal to or less than a correction error.

Additionally, the method may include repeatedly calculating a scheduled charge time to adjust the temperature difference to be within a preset range when a temperature difference resulting from the comparing is equal to or greater than a correction error. The method may further include, when the scheduled charge time is repeatedly calculated at an $n^{th}$ iteration, if a temperature difference between an expected $n^{th}$ scheduled charge start time and an $(n-1)^{th}$ expected primary scheduled charge start time is within the correction error, determining the $n^{th}$ scheduled charge time to be a final charge time.

In another aspect of the present disclosure, a scheduled charge control apparatus may include a charge time consumption calculation unit configured to calculate an expected charge time consumption based on charged current, a charger connection state, and a battery State of Charge (SOC), a scheduled charge time determination unit configured to calculate an expected primary scheduled charge start time, a climate-information-using charging-time-consumption recalculation unit configured to calculate an expected temperature for the primary scheduled charge time based on the primary scheduled charge time and charger temperature information or climate information, and to calculate expected charge time consumption corrected based on the calculated expected temperature, and a scheduled charge time correction unit configured to calculate secondary scheduled charge time based on the corrected expected charge time consumption.

BRIEF DESCRIPTION OF THE DRAWINGS

The accompanying drawings, which are included to provide a further understanding of the disclosure and are incorporated in and constitute a part of this application, illustrate exemplary embodiment(s) of the disclosure and together with the description serve to explain the principle of the disclosure. In the drawings.

DETAILED DESCRIPTION

Figure 1:
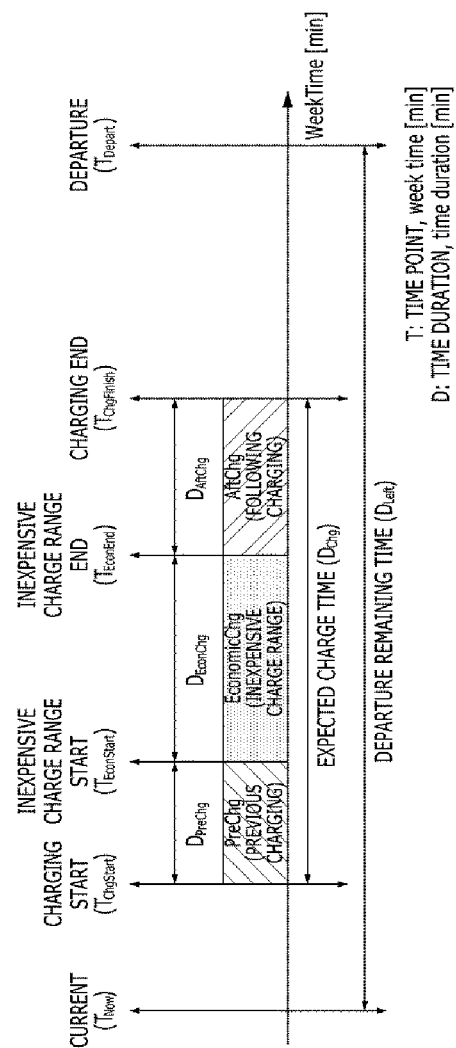
FIG. 1 is a diagram showing an example of charge time determination using a conventional scheduled charging method according to the related art.
Figure 2:
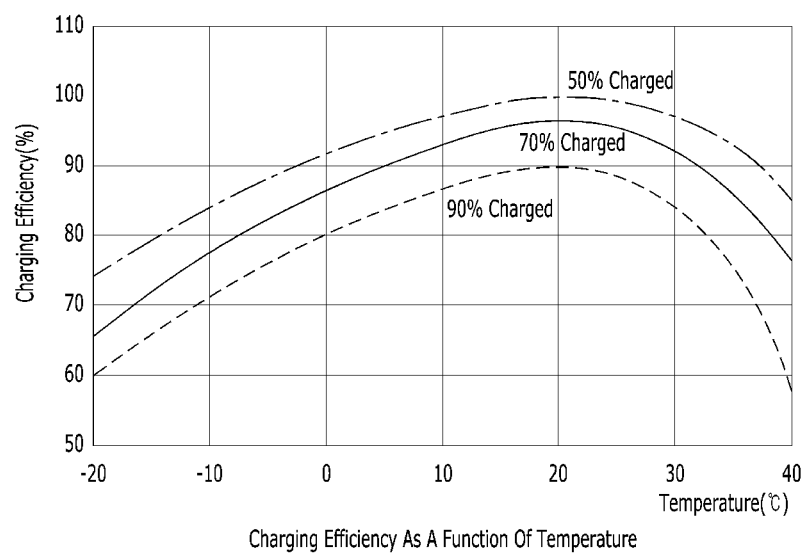
FIG. 2 is a diagram showing an example of battery temperature efficiency related to FIG. 1 according to the related art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Reference will now be made in detail to the exemplary embodiments of the present disclosure, examples of which are illustrated in the accompanying drawings. In the description of exemplary embodiments, it will be understood that, when an element is referred to as being "on", "under", "before" or "after" another element, the element can be directly on the other element, or intervening elements may be present. It will be understood that, although the terms "first", "second", "A", "B", "(a)", "(b)", etc. may be used herein to describe various elements of the present disclosure, these terms are only used to distinguish one element from another element, and the essential order or sequence of corresponding elements is not limited by these terms.

It will be understood that when one element is referred to as being "connected to", "coupled to", or "accessing" another element, the one element may be "connected to" or "coupled to" or "access" the other element via a further element, or the one element may be directly connected to or directly access another element. All terms including technical or scientific terms have the same meanings as those generally understood by a person having ordinary skill in the art to which the present disclosure pertains unless mentioned otherwise. Generally used terms, such as terms defined in a dictionary, should be interpreted to coincide with meanings of the related art from the context. Unless differently defined in the present disclosure, such terms should not be interpreted in an ideal or excessively formal manner.

Figure 3:
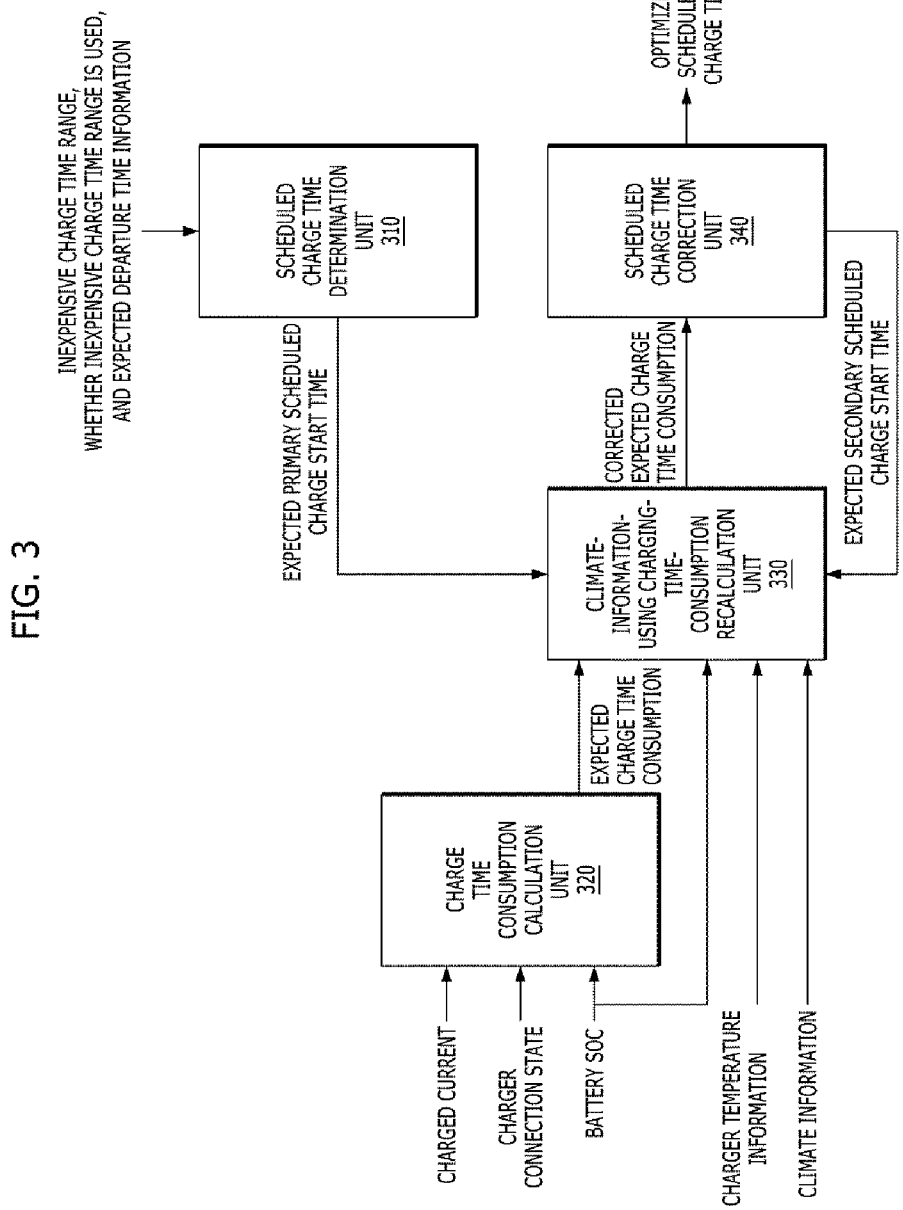
FIG. 3 is a block diagram showing the configuration of a scheduled charge control apparatus according to an exemplary embodiment of the present disclosure.

FIG. 3 is a block diagram showing the configuration of a scheduled charge control apparatus according to an exemplary embodiment of the present disclosure. Referring to FIG. 3, the scheduled charge control apparatus may include a scheduled charge time determination unit 310, a charge time consumption calculation unit 320, a climate-information-using charging-time-consumption recalculation unit 330, and a scheduled charge time correction unit 340. Each of the units of the apparatus may be operated by a controller having a processor and a memory. In particular, the controller may be specifically programmed to execute the operations of the units.

The scheduled charge time determination unit 310 may be configured to calculate an expected primary scheduled charge start time based on an inexpensive charge time range, information regarding whether the inexpensive charge time range is used, and expected departure time information. In some exemplary embodiments, the scheduled charge time determination unit 310 may be configured to determine scheduled charge time using a method of considering a departure time, an inexpensive charge time range, and an inexpensive charge range.

The scheduled charge time determination unit 310 may be configured to determine the scheduled charge time based on an inexpensive charge time range. In particular, the inexpensive charge time range may be a time range in which charging is enabled at a discount, such as nighttime with low electricity demand according to the country/area. In some exemplary embodiments, the scheduled charge time determination unit 310 may be configured to set the scheduled charge time only in the inexpensive charge time range. The scheduled charging may be performed only in the inexpensive charge time range, and even if a full charge is not achieved, charging may be performed only in the corresponding time range.

Further, the scheduled charge time determination unit 310 may be configured to set the scheduled charge time to be within the inexpensive charge time range. Scheduled charging may be performed to complete charging prior to the set departure time while including as long an inexpensive charge time range as possible (e.g., a maximum inexpensive charge time range). The charge time consumption calculation unit 320 may be configured to calculate the expected charge time consumption of the battery based on charged current, a charger connection state, and a battery State of Charge (SOC), which are received from a battery management system (BMS) of a vehicle.

The climate-information-using charging-time-consumption recalculation unit 330 (e.g., the recalculation unit) may be configured to calculate an expected temperature at the primary scheduled charge time based on the expected primary scheduled charge start time received from the scheduled charge time determination unit 310, the expected charge time consumption received from the charge time consumption calculation unit 320, charger temperature information, or climate information. Accordingly, the climate-information-using charging-time-consumption recalculation unit 330 may be configured to calculate the expected temperature ($T_{Bat,\,pred1}$) at the expected primary scheduled charge start time using Equation 1 below.

Particularly, the climate-information-using charging-time-consumption recalculation unit 330 may be configured to calculate the expected temperature ($T_{Bat,\,pred1}$) at the expected primary scheduled charge start time using time-based temperature information ($T_{char,\,pred}$) of an all-day charger. When time-based temperature information ($T_{char,\,pred}$) of the all-day charger does not exist (e.g., is not available), the climate-information-using charging-time-consumption recalculation unit 330 may be configured to calculate the expected temperature ($T_{Bat,\,pred1}$) at the expected primary scheduled charge start time using weather forecast climate information $T_{forecast1}$.

Further, the climate-information-using charging-time-consumption recalculation unit 330 may be configured to calculate a corrected expected primary charge time consumption ($D_{chg,\,adj1}$) based on battery efficiency and the battery SoC $SoC_{bat}$ at the calculated expected temperature using Equation 2 below.

$$D_{chg,adj1} = f\{\eta(T_{Bat,pred1}), SOC_{bat}\} \quad \text{Equation 2}$$

In particular, the charge time consumption may be time consumption data based on a pre-stored temperature. In other words, charge time consumption required at the corrected expected primary charge time consumption may be applied data that is previously acquired through a time consumption test based on temperature. Thus, the climate-information-using charging-time-consumption recalculation unit 330 may be configured to transmit the calculated corrected expected primary charge time consumption ($D_{chg,\,adj1}$) to the scheduled charge time correction unit 340.

The scheduled charge time correction unit 340 may be configured to recalculate secondary scheduled charge start time based on the corrected expected primary charge time consumption ($D_{chg,\,adj1}$) received from the climate-information-using charging-time-consumption recalculation unit 330. Then, the scheduled charge time correction unit 340 may be configured to transmit the recalculated secondary scheduled charge start time to the climate-information-using charging-time-consumption recalculation unit 330, and may be configured to receive corrected expected secondary charge time consumption ($D_{chg,\,adj2}$) corresponding to the secondary scheduled charge start time from the climate-information-using charging-time-consumption recalculation unit 330.

The corrected expected secondary charge time consumption ($D_{chg,\,adj2}$) calculated by the climate-information-using charging-time-consumption recalculation unit 330 may be calculated based on the expected temperature ($T_{Bat,\,pred2}$) at an expected secondary scheduled charge start time calculated using Equation 3 below.

$$T_{Bat,pred\,2} = \begin{cases} T_{char,pred\,2} (\text{if } T_{char,pred} \text{ is exist}) \\ T_{forecast\,2} (\text{if } T_{char,pred} \text{ is not exist}) \end{cases} \quad \text{Equation 3}$$

In other words, the climate-information-using charging-time-consumption recalculation unit 330 may be configured to calculate the expected temperature ($T_{Bat,\,pred2}$) of the expected secondary scheduled charge start time using the time-based temperature information ($T_{char,\,pred}$) of the all-day charger. In particular, when the time-based temperature information ($T_{char,\,pred}$) of the all-day charger does not exist (e.g., is not available), the climate-information-using charging-time-consumption recalculation unit 330 may be configured to calculate the expected temperature ($T_{Bat,\,pred1}$) of the expected primary scheduled charge start time using the weather forecast climate information $T_{forecast1}$.

Thus, the scheduled charge time correction unit 340 may be configured to receive a corrected expected secondary charge time consumption ($D_{chg,\,adj2}$) that is calculated based on a temperature for the secondary scheduled charge start time calculated based on the charger temperature information at the secondary scheduled charge start time or weather forecast climate information by the climate-information-using charging-time-consumption recalculation unit 330.

The scheduled charge time correction unit 340 may be configured to compare an expected temperature for the expected secondary scheduled charge start time and an expected temperature for the expected primary scheduled charge start time. Then, the scheduled charge time correction unit 340 may be configured to determine the secondary $$T_{Bat,pred\,1} = \begin{cases} T_{char,pred\,1} (\text{if } T_{char,pred} \text{ is exist}) \\ T_{forecast\,1} (\text{if } T_{char,pred} \text{ is not exist}) \end{cases} \quad \text{Equation 1}$$

scheduled charge time to be a final charge time when a time difference is equal to or less than a correction error $E_{adj}$. In some exemplary embodiments, the correction error may be a temperature at which a charge time consumption difference is within about five minutes.

The scheduled charge time correction unit 340 may be configured to calculate a tertiary scheduled charge time through a procedure of the climate-information-using charging-time-consumption recalculation unit 330 when the temperature difference is equal to or greater than the correction error $E_{adj}$. Thus, the scheduled charge time correction unit 340 may be configured to repeatedly perform the above procedure, and when a temperature difference between an $n^{th}$ scheduled charge start time and an $(n-1)^{th}$ expected primary scheduled charge start time is within the correction error $E_{adj}$, the scheduled charge time correction unit 340 may be configured to determine an $n^{th}$ scheduled charge time to be a final charge time using Equation 4 below.

$$Schedule_{adj,fin} = Schedule_{adj\ n}$$

$$\{if\ abs(T_{Bat,pred\ n} - T_{Bat,pred(n-1)}) < \in_{adj}\} \qquad \text{Equation 4}$$

Accordingly, according to another exemplary embodiment of the present disclosure, the scheduled charge time correction unit 340 may be configured to optimize the scheduled charge time based on the determined final charge time, and thus a full-charge success rate of scheduled charging of a battery may be increased.

Figure 4:
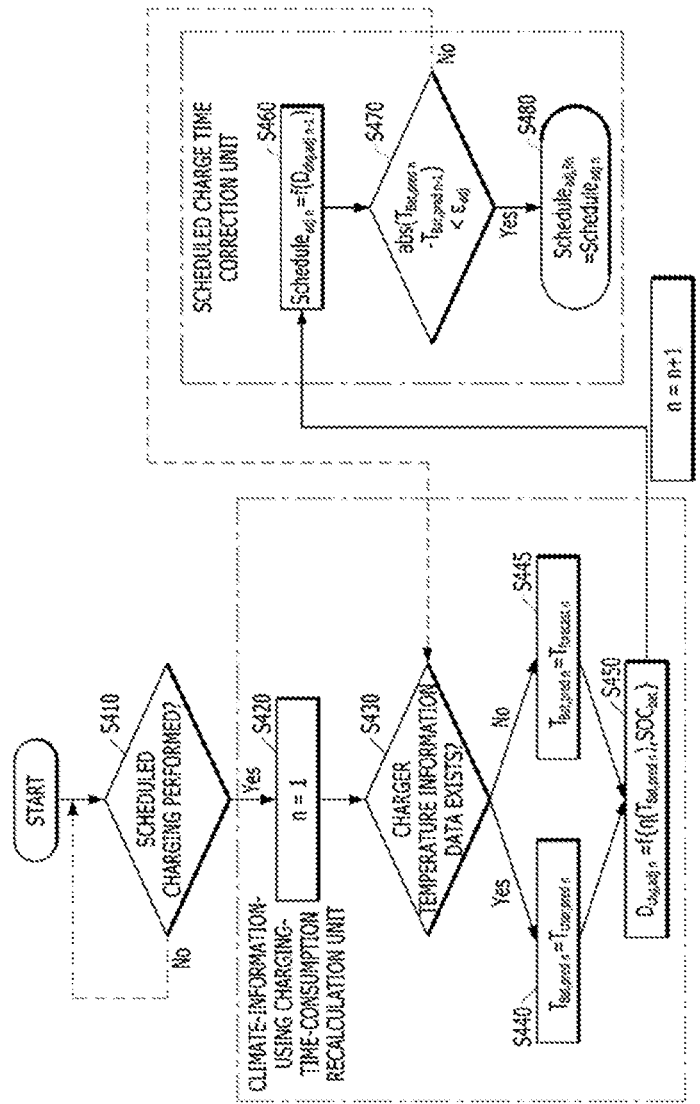
FIG. 4 is a diagram showing a method of controlling scheduled charging according to an exemplary embodiment of the present disclosure.

FIG. 4 is a diagram showing a method of controlling scheduled charging according to an exemplary embodiment of the present disclosure. Referring to FIG. 4, the scheduled charge control apparatus may be configured to determine whether scheduled charging is performed (S410). When operation S410 is satisfied, if an iteration of performing scheduled charging is n=1 (S420), the climate-information-using charging-time-consumption recalculation unit 330 may be configured to determine whether charger temperature information exists (S430) or is available.

When operation S430 is satisfied, the climate-information-using charging-time-consumption recalculation unit 330 may be configured to calculate the expected temperature ($T_{Bat,\ predn}$) of an expected $n^{th}$ scheduled charge start time using time-based temperature information ($T_{char,\ predn}$) of an all-day charger (S440). When operation S430 is not satisfied, the climate-information-using charging-time-consumption recalculation unit 330 may be configured to calculate the expected temperature ($T_{Bat,\ predn}$) of the expected $n^{th}$ scheduled charge start time using weather forecast climate information $T_{forecastn}$ (S445).

After operation S440 or S445, the climate-information-using charging-time-consumption recalculation unit 330 may be configured to calculate a corrected expected $(n-1)^{th}$ charge time consumption ($D_{chg,\ adjn-1}$) based on battery efficiency and a battery SoC ($SoC_{bat}$) at an expected temperature (S450). After operation S450, the scheduled charge time correction unit 340 may be configured to calculate $n^{th}$ scheduled charge time based on the corrected expected $(n-1)^{th}$ charge time consumption ($D_{chg,\ adjn-1}$) (S460).

After operation S460, the scheduled charge time correction unit 340 may be configured to determine whether a difference between the expected temperature ($T_{Bat,\ predn}$) for the expected $n^{th}$ scheduled charge start time and expected temperature ($T_{Bat,\ predn-1}$) for the expected $(n-1)^{th}$ primary scheduled charge start time is equal to or less than the correction error $E_{adj}$ (S470). When operation S470 is satisfied, if the temperature difference is equal to or less than the correction error $E_{adj}$, the scheduled charge time correction unit 340 may be configured to determine an $n^{th}$ scheduled charge time schedule$_{adjn}$ to be a final charge time (schedule$_{adj,\ fin}$) (S480).

The aforementioned scheduled charge control apparatus may increase a full-charge success rate through scheduled charging using a procedure of correcting a charging time based on climate information in consideration of efficiency based on a battery temperature. Additionally, the method of controlling scheduled charging according to the present disclosure may correct an actual charge time using charger temperature information or weather forecast climate information when determining a time at which to perform a scheduled charging function.

According to the present disclosure, a charging time may be recalculated using the corrected expected charge time and a full-charge success rate of scheduled charging may be increased. When an expected battery temperature difference between a corrected time and an initial time is substantial according to the corrected time, correction may be repeatedly performed to adjust the expected battery temperature difference to be within a preset range. Accordingly, the scheduled charge time may be optimized, and a charge time may be applied based on a temperature, thereby increasing a full-charge success rate. In others, after the charging time is corrected, the vehicle controller may be configured to charge the vehicle battery based on the corrected and final charging time.

It will be appreciated by persons skilled in the art that that the effects that could be achieved with the present disclosure are not limited to what has been particularly described hereinabove and other advantages of the present disclosure will be more clearly understood from the detailed description.

The disclosure may also be embodied as computer readable code on a non-transitory computer readable recording medium. The non-transitory computer readable recording medium is any data storage device that can store data which can be thereafter read by a computer system. Examples of the non-transitory computer readable recording medium include read-only memory (ROM), random-access memory (RAM), CD-ROMs, magnetic tapes, floppy disks, optical data storage devices, etc. The non-transitory computer readable recording medium can also be distributed over network coupled computer systems so that the computer readable code is stored and executed in a distributed fashion. Additionally, functional programs, code, and code segments for accomplishing the present disclosure can be easily construed by programmers skilled in the art to which the present disclosure pertains.

What is claimed is:

1. A method of controlling scheduled charging, comprising:

calculating, by a controller, a primary scheduled charge time based on an expected charge time consumption and an expected primary scheduled charge start time;

calculating, by the controller, an expected temperature for the primary scheduled charge time based on the primary scheduled charge time and charger temperature information or climate information;

calculating, by the controller, a corrected expected charge time consumption based on the calculated expected temperature;

calculating, by the controller, a secondary scheduled charge time based on the corrected expected charge time consumption; and charging, by the controller, a battery of a vehicle based on the secondary scheduled charge time.

2. The method of claim 1, wherein the calculating of the expected temperature for the primary scheduled charge time includes determining whether the charger temperature information is available.

3. The method of claim 2, wherein the calculating the expected temperature for the primary scheduled charge time includes:
calculating, by the controller, an expected temperature for the expected primary scheduled charge start time based on the charger temperature information when the charger temperature information is available.

4. The method of claim 2, wherein the calculating the expected temperature for the primary scheduled charge time includes:
calculating, by the controller, an expected temperature for the expected primary scheduled charge start time based on the climate information when the charger temperature information is unavailable.

5. The method of claim 3, wherein the charger temperature information includes time-based temperature information of an all-day charger.

6. The method of claim 1, further comprising:
comparing, by the controller, an expected temperature for the expected secondary scheduled charge start time with an expected temperature for the expected primary scheduled charge start time.

7. The method of claim 6, further comprising:
determining, by the controller, the secondary scheduled charge time to be a final charge time when a temperature difference resulting from comparing the expected temperature for the expected secondary scheduled charge start time with the expected temperature for the expected primary scheduled charge start time is equal to or less than a correction error; and
charging, by the controller, the battery of the vehicle based on the final charge time.

8. The method of claim 6, further comprising:
repeatedly calculating, by the controller, a scheduled charge time to adjust the temperature difference to be within a preset range when a temperature difference resulting from comparing the expected temperature for the expected secondary scheduled charge start time with the expected temperature for the expected primary scheduled charge start time is equal to or greater than a correction error.

9. The method of claim 8, further comprising:
when the scheduled charge time is repeatedly calculated at an $n^{th}$ iteration, if a temperature difference between an expected $n^{th}$ scheduled charge start time and an $(n-1)^{th}$ expected primary scheduled charge start time is within the correction error, determining, by the controller, the $n^{th}$ scheduled charge time to be a final charge time.

10. A non-transitory computer readable recording medium having recorded thereon a program for executing the method of claim 1.

11. A scheduled charge control apparatus, comprising:
a charge time consumption calculation unit configured to calculate an expected charge time consumption based on charged current, a charger connection state, and a battery State of Charge (SoC);
a scheduled charge time determination unit configured to calculate an expected primary scheduled charge start time;
a climate-information-using charging-time-consumption recalculation unit configured to calculate an expected temperature for the primary scheduled charge time based on the primary scheduled charge time and charger temperature information or climate information, and to calculate expected charge time consumption corrected based on the calculated expected temperature;
a scheduled charge time correction unit configured to calculate secondary scheduled charge time based on the corrected expected charge time consumption; and
a vehicle controller configured to execute charging of a vehicle battery based on the secondary scheduled charge time.

12. The scheduled charge control apparatus of claim 11, wherein the climate-information-using charging-time-consumption recalculation unit is configured to determine whether the charger temperature information is available.

13. The scheduled charge control apparatus of claim 12, wherein the climate-information-using charging-time-consumption recalculation unit is configured to calculate an expected temperature for the expected primary scheduled charge start time based on the charger temperature information when the charger temperature information is available.

14. The scheduled charge control apparatus of claim 12, wherein the climate-information-using charging-time-consumption recalculation unit is configured to calculate an expected temperature for the expected primary scheduled charge start time based on the climate information when the charger temperature information is unavailable.

15. The scheduled charge control apparatus of claim 13, wherein the charger temperature information includes time-based temperature information of an all-day charger.

16. The scheduled charge control apparatus of claim 11, wherein the scheduled charge time correction unit is configured to compare an expected temperature for the expected secondary scheduled charge start time with an expected temperature for the expected primary scheduled charge start time.

17. The scheduled charge control apparatus of claim 16, wherein the scheduled charge time correction unit is configured to determine the secondary scheduled charge time to be a final charge time when a temperature difference resulting from comparing the expected temperature for the expected secondary scheduled charge start time with the expected temperature for the expected primary scheduled charge start time is equal to or less than a correction error.

18. The scheduled charge control apparatus of claim 16, wherein the climate-information-using charging-time-consumption recalculation unit is configured to repeatedly calculate scheduled charge time to adjust the temperature difference to be within a preset range when a temperature difference resulting from comparing the expected temperature for the expected secondary scheduled charge start time with the expected temperature for the expected primary scheduled charge start time is equal to or greater than a correction error.

19. The scheduled charge control apparatus of claim 18, wherein, when the scheduled charge time is repeatedly calculated at an $n^{th}$ iteration, if a temperature difference between an expected $n^{th}$ scheduled charge start time and an $(n-1)^{th}$ expected primary scheduled charge start time is within the correction error, the scheduled charge time correction unit is configured to determine the $n^{th}$ scheduled charge time to be a final charge time.

* * * * *